(12) United States Patent
Brossard et al.

(10) Patent No.: US 11,704,100 B2
(45) Date of Patent: Jul. 18, 2023

(54) INLINE COMPILATION OF USER DEFINED FUNCTIONS

(71) Applicant: Snowflake Inc., Bozeman, MT (US)

(72) Inventors: Elliott Brossard, Kirkland, WA (US); Siddharth Kulkarni, Sammamish, WA (US); Isaac Kunen, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/823,621

(22) Filed: Aug. 31, 2022

(65) Prior Publication Data

US 2022/0413816 A1    Dec. 29, 2022

Related U.S. Application Data

(63) Continuation of application No. 17/389,871, filed on Jul. 30, 2021, now Pat. No. 11,461,080.

(60) Provisional application No. 63/197,712, filed on Jun. 7, 2021.

(51) Int. Cl.
| | |
|---|---|
| *G06F 8/41* | (2018.01) |
| *G06F 21/60* | (2013.01) |
| *G06F 9/54* | (2006.01) |
| *G06F 21/53* | (2013.01) |
| *G06F 16/2455* | (2019.01) |
| *G06F 16/245* | (2019.01) |

(52) U.S. Cl.
CPC .............. *G06F 8/44* (2013.01); *G06F 9/547* (2013.01); *G06F 16/245* (2019.01); *G06F 16/2455* (2019.01); *G06F 21/53* (2013.01); *G06F 21/602* (2013.01)

(58) Field of Classification Search
CPC .... G06F 8/40–49; G06F 16/24; G06F 16/245; G06F 16/2455
USPC .......................................................... 717/140
See application file for complete search history.

(56) References Cited

U.S. PATENT DOCUMENTS

| | | | |
|---|---|---|---|
| 2004/0143823 A1 | 7/2004 | Wei | |
| 2005/0160100 A1* | 7/2005 | Eikenhorst | .......... G06F 16/2455 |
| 2006/0020620 A1 | 1/2006 | Iyer et al. | |
| 2010/0036801 A1* | 2/2010 | Pirvali | .................... G06F 8/443 |
| | | | 707/E17.017 |
| 2010/0313079 A1 | 12/2010 | Beretta et al. | |
| 2012/0260102 A1 | 10/2012 | Zaks et al. | |

(Continued)

FOREIGN PATENT DOCUMENTS

| | | | | |
|---|---|---|---|---|
| WO | WO-2013091195 A1 * | 6/2013 | ............. | G06F 9/466 |
| WO | WO-2013154398 A1 * | 10/2013 | ............... | G06F 8/61 |

OTHER PUBLICATIONS

"U.S. Appl. No. 17/389,871, Final Office Action dated Feb. 24, 2022", 15 pgs.

(Continued)

*Primary Examiner* — Geoffrey R St Leger
(74) *Attorney, Agent, or Firm* — Schwegman Lundberg & Woessner, P.A.

(57) ABSTRACT

Embodiments described herein provide techniques for in-line compiling of UDFs in other programming languages. These techniques enable faster programming iterations because it allows users to compile directly in the cloud processing system. Moreover, it allows the UDFs to tie into existing libraries. The compiled results are treated as sensitive and handled with appropriate security policies, as with any other user data in the system.

18 Claims, 9 Drawing Sheets

(56) References Cited

U.S. PATENT DOCUMENTS

| | | | |
|---|---|---|---|
| 2015/0220597 A1* | 8/2015 | Simhadri | G06F 16/24534 |
| | | | 707/797 |
| 2018/0267951 A1 | 9/2018 | Moah et al. | |
| 2019/0026336 A1* | 1/2019 | Tian | G06F 16/2455 |
| 2019/0087278 A1 | 3/2019 | Almog | |
| 2020/0210585 A1 | 7/2020 | Thom et al. | |
| 2021/0303371 A1* | 9/2021 | Wang | G06F 16/245 |

OTHER PUBLICATIONS

"U.S. Appl. No. 17/389,871, Non Final Office Action dated Nov. 3, 2021", 14 pgs.

"U.S. Appl. No. 17/389,871, Notice of Allowance dated Jun. 9, 2022", 9 pgs.

"U.S. Appl. No. 17/389,871, Response filed Feb. 3, 2022 to Non Final Office Action dated Nov. 3, 2021", 13 pgs.

"U.S. Appl. No. 17/389,871, Response filed May 23, 2022 to Final Office Action dated Feb. 24, 2022", 10 pgs.

Crotty, Andrew, et al., "An Architecture for Compiling UDF-centric Workflow", Proceedings of the VLDB Endowment vol. 8 Issue 12, [retrieved on Jun. 2, 2022], Retrieved from the Internet: <URL:http://dl.acm.org/>, (Aug. 2015), 1466-1477.

Manoharan, Gokul Nath Babu, et al., "Shasta: Interactive Reporting At Scale", SIGMOD '16: Proceedings of the 2016 International Conference on Management of Data, [retrieved on Jun. 2, 2022], Retrieved from the Internet: <URL:http://dl.acm.org/>, (Jun. 2016), 1393-1404.

\* cited by examiner

US 11,704,100 B2

INLINE COMPILATION OF USER DEFINED FUNCTIONS

CROSS-REFERENCE TO RELATED APPLICATION

This application is a Continuation of U.S. patent application Ser. No. 17/389,871, filed Jul. 30, 2021, which claims the benefit of priority to U.S. Provisional Patent Application Ser. No. 63/197,712 filed Jun. 7, 2021, the contents of which are incorporated herein by reference in their entireties.

TECHNICAL FIELD

The present disclosure generally relates to cloud computing, more specifically to compilation of inline code from User-Defined Functions (UDF) in a secure environment.

BACKGROUND

Cloud-based data warehouses and other cloud database systems or data platforms sometimes provide support for user-defined functions that enable such systems to perform operations that are not available through the built-in, system-defined functions. However, for mitigating security risks, security mechanisms to ensure that user code running on such systems remain isolated are used.

Some programs execute on multi-tenant cloud environments, and their programs include user-defined functions (UDFs). To provide security, the programs are executed in safe environments, isolated from other tenants. However, if the UDFs are defined in other programming languages, they are typically compiled at a different location. This makes using UDFs in other programming languages difficult and time consuming.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In computer security, a sandbox (e.g., sandbox environment) is a security mechanism for separating running programs, usually to prevent system failures or prevent exploitation of software vulnerabilities. A sandbox can be used to execute untested or untrusted programs or code, possibly from unverified or untrusted third parties, suppliers, users or websites, without risking harm to the host machine or operating system. A sandbox can provide a tightly controlled set of resources for guest programs to run in, such as storage and memory scratch space. Network access, the ability to inspect the host system or read from input devices can be disallowed or restricted. UDFs typically can run in a sandbox environment.

Providing UDFs in other programming languages (e.g., JAVA) is a useful tool. However, some existing solutions for providing such UDFs suffer from significant drawbacks. For example, typically the UDF in another programming language is compiled separately (i.e., precompiled) at a local device and the compiled results (e.g., JAR file) are imported for use. Embodiments described herein provide techniques for in-line UDF compiling of UDFs in other programming languages. These techniques enable faster programming iterations because it allows users to compile directly in the cloud processing system. Moreover, it allows the UDFs to tie into existing libraries. The compiled results are treated as sensitive and handled with appropriate security policies.

Figure 1:
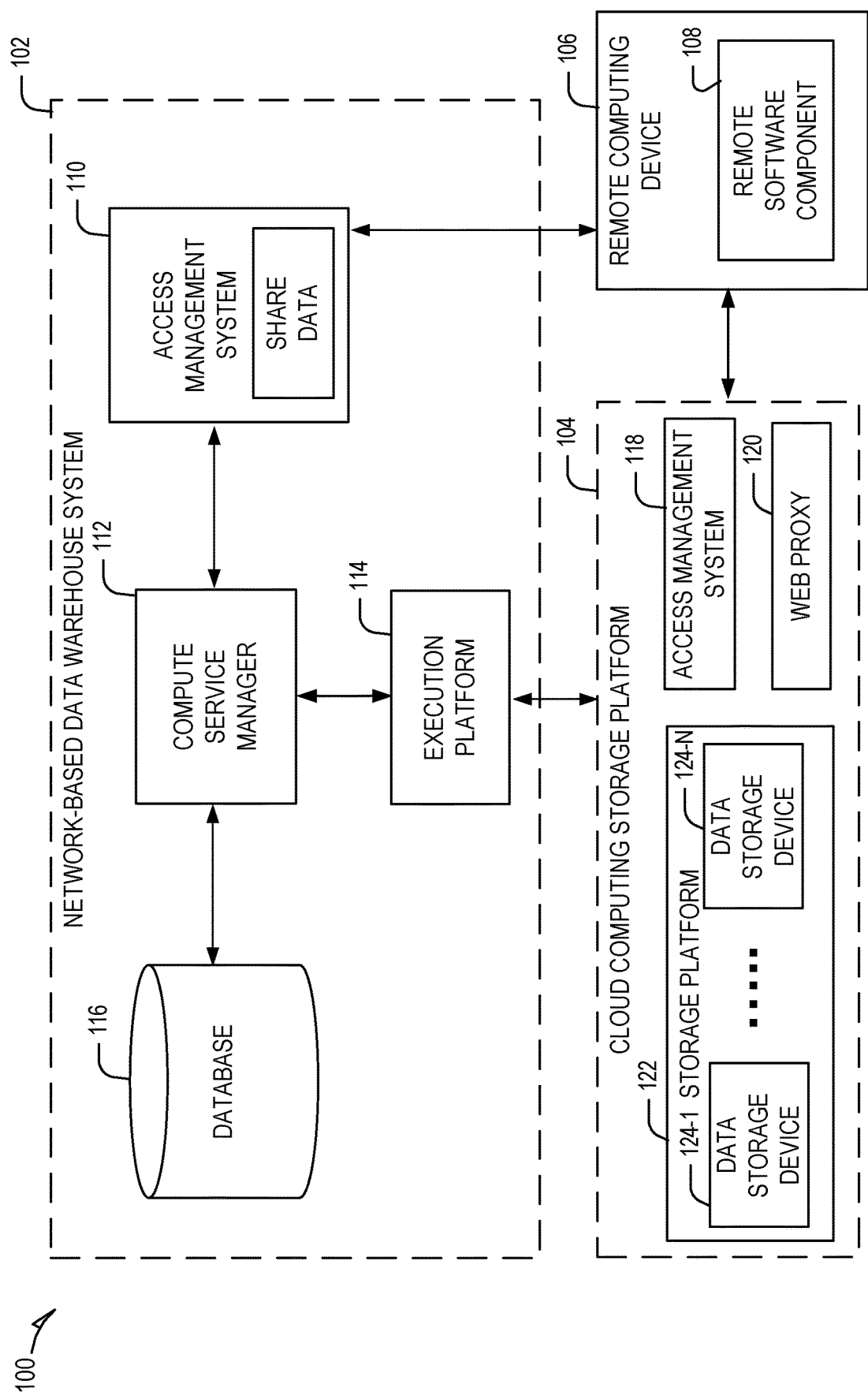
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generate result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
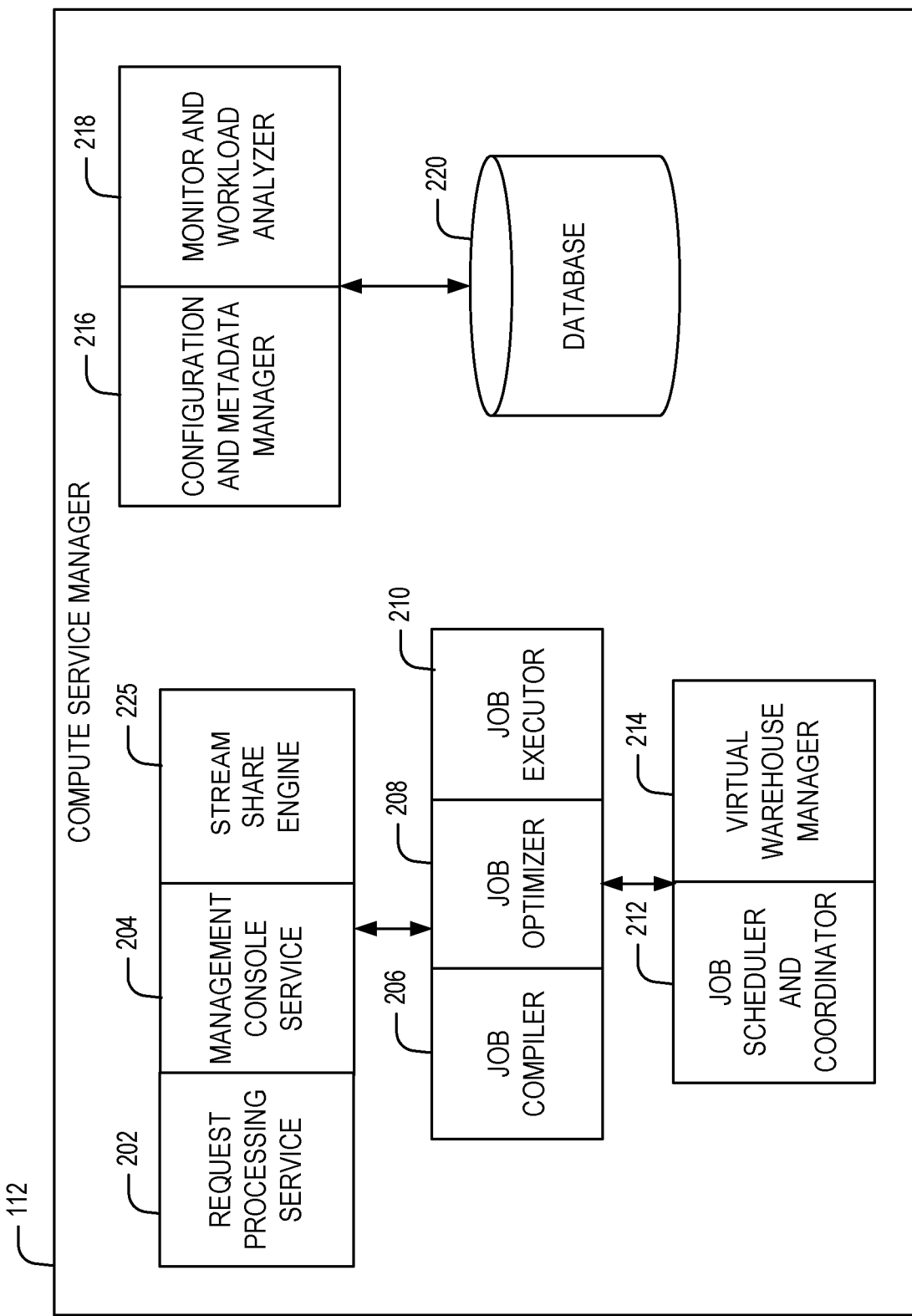
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
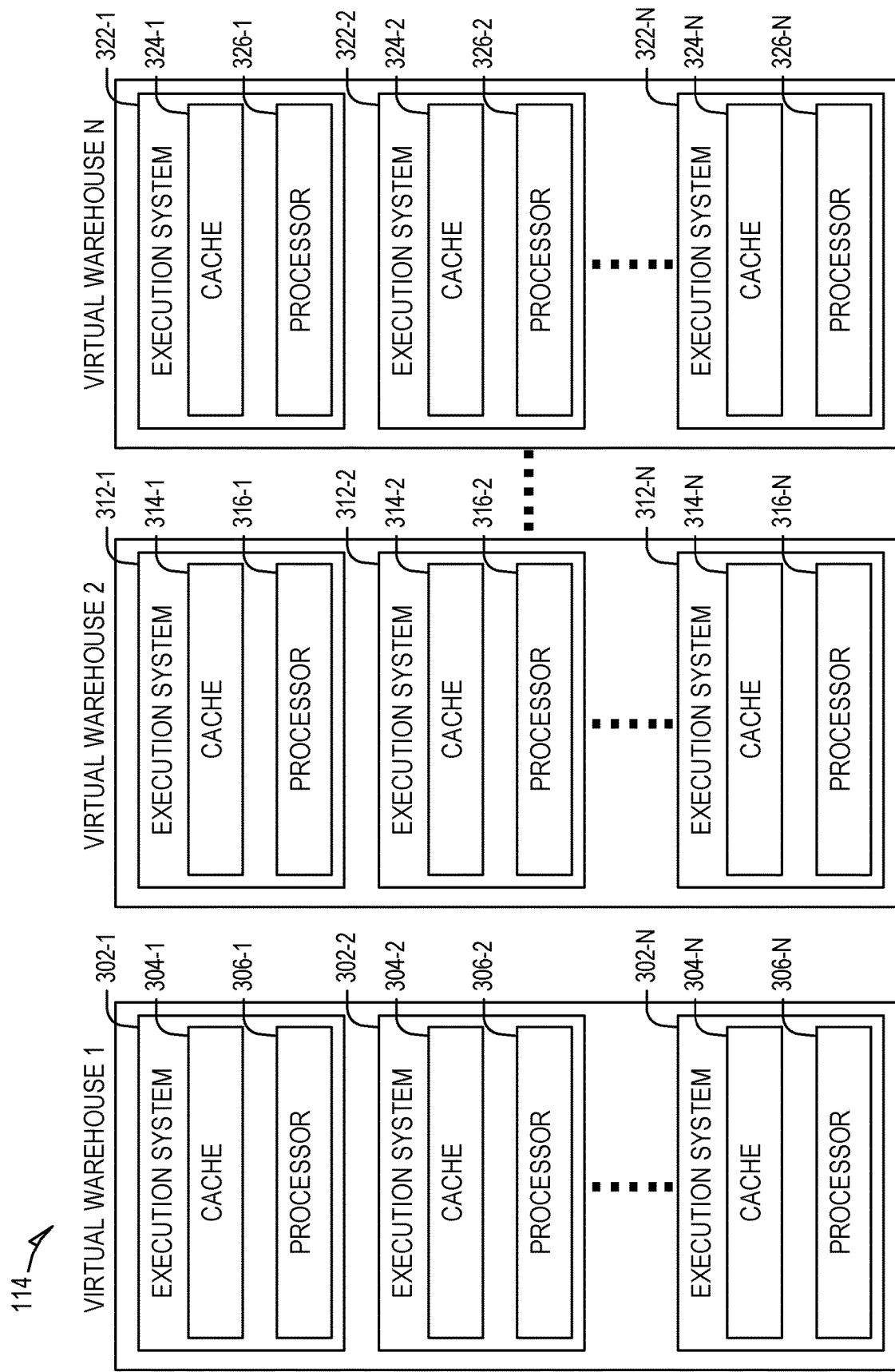
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
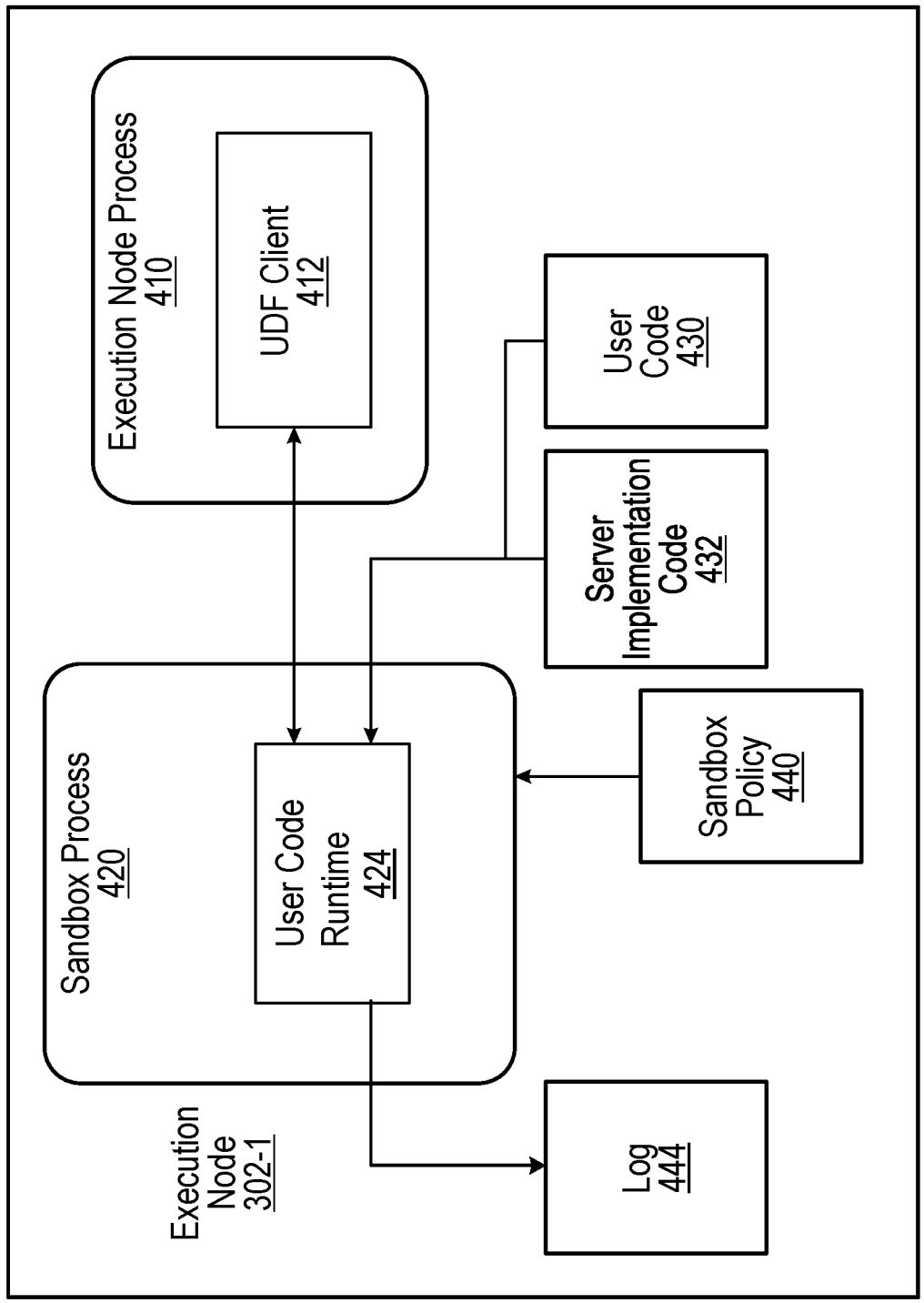
FIG. 4 shows a computing environment, according to some example embodiments.

FIG. 4 shows an example of a computing environment 400 conceptually illustrating an example software architecture executing a UDF by a process running on a given execution node of the execution platform, according to some example embodiments. The execution node may include an execution node process 410 with a UDF client 412, a sandbox process 420 with a user code runtime 424, a user code 430, a server implementation code 432, a sandbox policy 440, and a log 444.

The execution node process 410 is executing a UDF Client 412 in the example of FIG. 4. In an embodiment, the UDF client 412 is implemented to support UDFs written in a particular programming language such as JAVA and the like. In an embodiment, the UDF client 412 is implemented in a different programming language (e.g., C or C++) than the user code 430, which can further improve security of the computing environment 400 by using a different codebase (e.g., one without the same or fewer potential security exploits).

User code 430 may be provided as a package e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA based UDF) can be performed by a user code runtime 424 executing within a sandbox process 420 (described further below). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node, or at a separate location such as the storage platform, as described above. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa).

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object-oriented programming language), it is appreciated that the other programming languages (e.g., compilation-based programming languages) are supported by the computing environment 400.

In some embodiments described herein, in-line compilation is enabled within the sandbox environment for UDFs. Users can compile and then debug and troubleshoot their programs within the sandbox. The in-line compilation techniques described herein are designed to work with multiple environments, e.g., JAVA, STELLA, etc. Some embodiments are presented with reference to JAVA, but the same principles may be used for other compilation-based programming environments.

The compiled data is treated as sensitive data and is protected according to the defined security policies as described herein. Further, the results may be encrypted, (e.g., using four session encryption keys), and when the compiled data is sent to storage, it may be compressed and encrypted.

Figure 5:
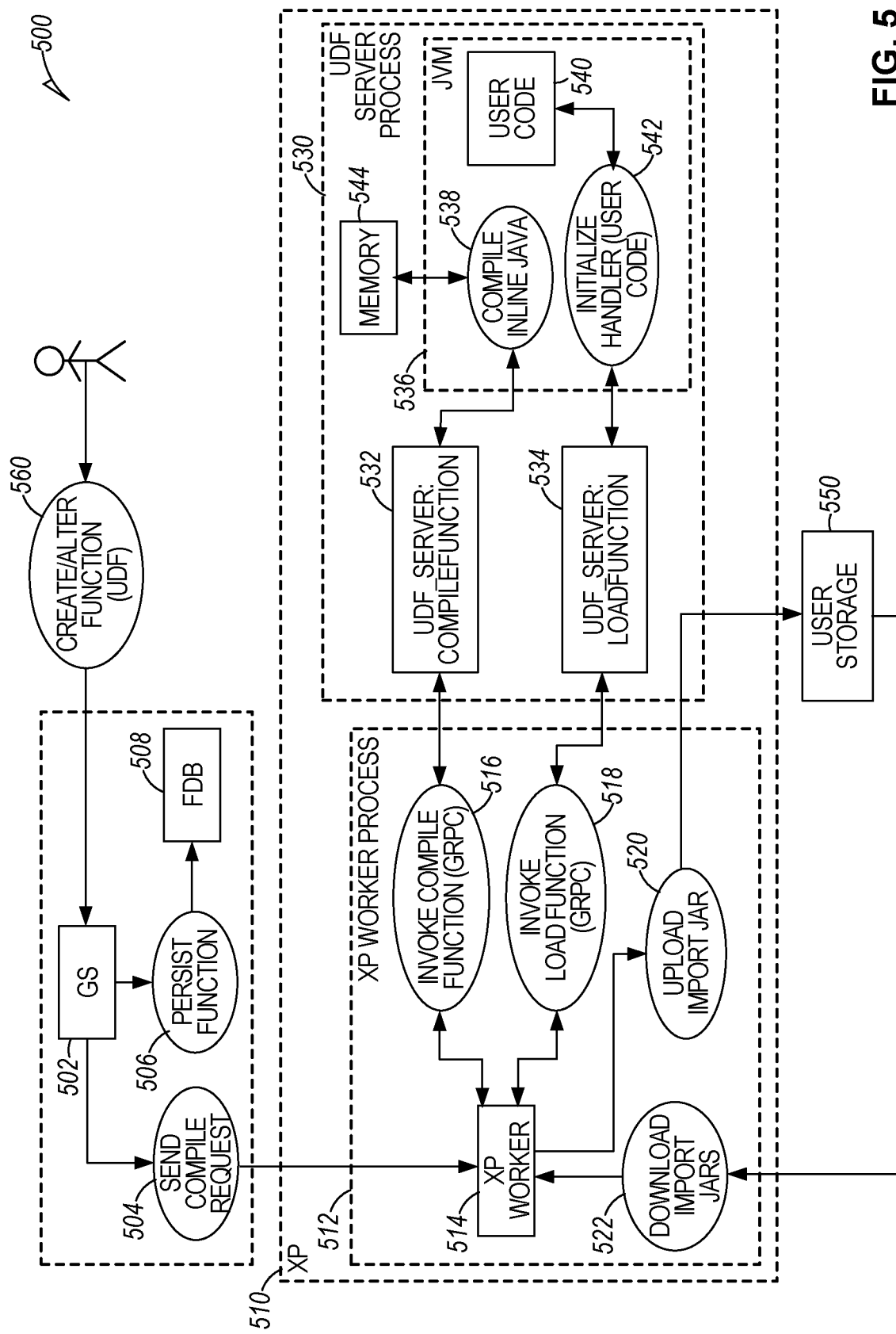
FIG. 5 shows a computing architecture for in-line compilation of UDF data, according to some example embodiments.

FIG. 5 shows an example of a computing architecture 500 for in-line compilation of UDF data, according to some example embodiments. The computing architecture may include a global service (GS) 502 with a compiler 504 (Send Compile Request), a persist function 506, a metadata store 508 (FDB), an XP 510 (Execution Platform), and a user storage 550. The XP 510 may include a worker process 512. The worker process 512 may include an XP worker 514 and a gRPC (Remote Procedure Call) client, such as an Invoke Compile Function 516 and Invoke Load Function 518.

The XP 510 may also include a UDF server 530. The UDF server 530 may be provided as a sandbox and may be separated from the worker process so that the UDF server 530 is restricted from accessing certain files and file systems. For example, the worker process 512 and the UDF server 530 may be provided as different processors on the same machine. The UDF server 530 may be provided in a common programming language such as C++. The UDF server 530 may include a remote procedure call framework such gRPC or other RPC client (e.g., udf_server: Compile Function 532, udf_server: LoadFunction 534), a language-specific integration (e.g., Java Virtual Machine (JVM) 536 in this example) with a memory 544. The language-specific integration 536 may correspond to a different programming language than the UDF server, such as JAVA, STELLA etc. Indeed, the techniques described herein can be used for in-line compilation of functions in different programming languages. The language-specific integration may include a Compile Inline Code function 538 (e.g., Compile Inline Java in this example), a User Code 540, and a Initialize Handler function 542. The worker process 512 may communicate in a bi-directional mode with the UDF server 530 using their respective API calls, e.g., using a gRPC client.

A user may use the create/alter function 560 to create or alter a UDF. The UDF may include code in another programming language in the function body. For example, the UDF may include JAVA code in the UDF body. This code may then be compiled in-line in the cloud processing system, instead of being compiled at another location. Thus, the user may be able to program directly in the cloud processing system in another language. In an embodiment, the UDF may define a target or user storage, which is the storage location where the results of in-line compilation (e.g., JAR files) will be uploaded and stored. The target storage may be an internal or external location. An internal location may be managed by the cloud processing system and therefore may be encrypted by the cloud processing system. For example, the results corresponding to the UDF may be encrypted using managed keys by the cloud processing system.

An external location corresponds to a storage location outside the control of the cloud processing system. For example, an external location may be at another cloud storage location. Thus, permission may be granted to the cloud processing system to access and store the results to the external location. In an embodiment, encryption may be utilized for the transmitting and storing the results in the external location. For example, encryption keys (e.g., ASK, KMS) may be provided to the cloud processing system to encrypt the results using the encryption keys for transmission and storage to the external location.

In an example, the UDF may include JAVA code. The JAVA code may define a class as public and may define a public method inside the class. The method may be static or non-static. The class may define more than one method. The method may accept arguments with specified data types. Method arguments may be bound by position. The first argument passed to the UDF may be the first argument received by the JAVA method. An appropriate return type may also be defined. The JAVA UDF may be a scalar function and may return one value each time it is invoked. The return type may be one of a specified data types, which may be compatible with SQL (or the language of the cloud processing system).

The GS 502 may transmit the UDF to the XP 510. In turn, the worker process 512 may transmit the body of the UDF (e.g., code in another programming language) to the UDF server 530 via a remote call framework (e.g., gRPC). The UDF server 530 runs on a separate sandbox than the worker process 512. The gRPC client and gRPC server have a communication path to exchange the function code and the compiled data. When the UDF server 530 is created, the language-specific integration 536 is created inside the sandbox (UDF server). For example, the language-specific integration 536 may be provided as a Java Virtual Machine (JVM) for a Java implementation.

The Compile Inline Code function 538 may compile the function body code received. The Compile Inline Code function 538 may use the memory 544 for this compilation. In a JAVA example, the Compile Inline Code function 538 may use a two-step process. First, it may convert the raw JAVA code from the UDF body into a class file, which is also referred to as an intermediate compiled file. This intermediate file may be stored in the memory. Second, this intermediate memory may be converted to a JAR file. Moreover, the compilation is performed inside the sandbox thus preventing the compilation from adversely affecting other parts of the cloud processing system.

The gRPC client in the UDF server 530 streams the compiled data (e.g., via a provided API) to the gRPC client in the worker process 512, and data may be streamed in both directions (e.g., code functions). The compiled data may be buffered and then transmitted through the stream. The worker process 512 may then upload the compiled data to the user storage 550 (via Upload function 520) and then download the compiled data when needed (via Download function 522). In some example embodiments, for security reasons, the compiled data may be treated as a message and is not changed or accessed, just treated as a stream of bytes to be forwarded until it reaches the user storage. The user storage 550 may be an internal or external storage, as described above.

Figure 6:
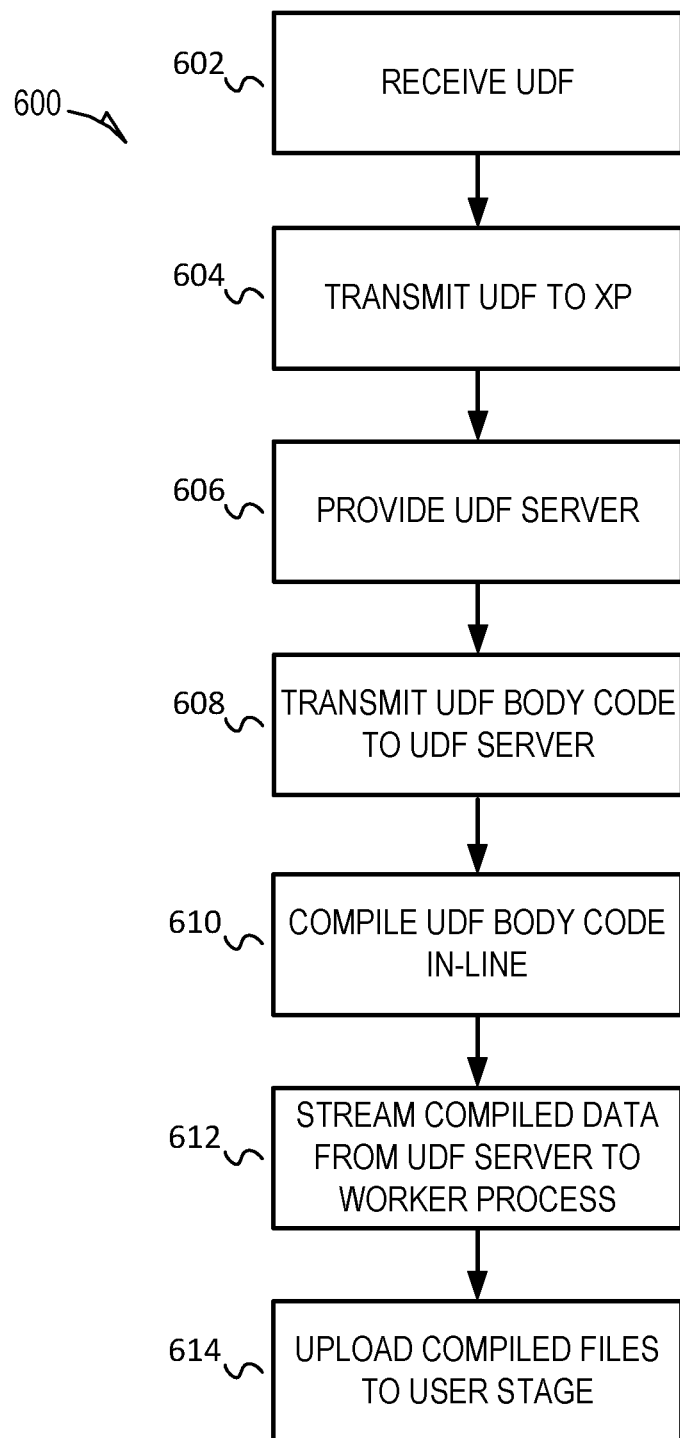
FIG. 6 a flow diagram of a method for in-line compilation, according to some example embodiments.

FIG. 6 shows a flow diagram of a method 600 for in-line compilation, according to some example embodiments. In an example, portions of the method 600 may be performed by the computing architecture, as described above with reference to FIG. 5.

At operation 602, a UDF may be received. For example, the UDF may be created or altered by a user, via a GS. The UDF may include a function body in a different programming language than used by the cloud processing system. For example, the UDF may include a function body in JAVA code. For example, a "CREATE FUNCTION" statement may include the JAVA code. In an embodiment, the UDF may also include a target storage for where the results of the compiled UDF are to be stored, e.g., User Storage. The GS may recognize that the UDF includes code in another language for compilation.

The UDF may include multiple callable functions. For example, multiple "CREATE FUNCTION" statements may reference the same JAR file but specify different handler functions within the JAR file. The JAVA UDF may include one callable function, but that callable function may be configured to call other functions.

The UDF may also define the target storage (or target path) for where the compiled results of the UDF are to be stored.

An example of the syntax for creating a UDF is as follows:

```
create function add (x integer, y integer)
returns integer
language java
called on null input
handler=TestAddFunc.add'
```

-continued

```
target_path='@~TestAddFunc.jar'
as
$$
'class TestAddFunc {
  public static int add (int x, int y) {
    return x + y;
    }
  }
$$;
```

In this example, the JAVA source code is specified in the "as" clause (e.g., surrounded by the pair of dollar signs ($$)).

At operation 604, the UDF may be transmitted to an XP as a compile request. For example, the UDF may be sent to a worker process in the XP.

At operation 606, for each function requiring a sandbox, e.g., UDF, a sandbox (or UDF server) may be created or provided. Access to certain files may be restricted to the UDF server. The worker process and UDF server may communicate via remote calls (e.g., gRPC).

At operation 608, the UDF body code may be transmitted to the UDF server via gRPC.

At operation 610, UDF server may employ a language-specific integration (e.g., JVM) to compile the UDF body code (i.e., in-line compilation). In one example, the JAR file may be organized as:

- developmentDirectory
  - packageDirectory
    - class_file1.java
    - class_file2.java
  - classDirectory
    - class_file1.class
    - class_file2.class
  - manifest_file.manifest (optional)
  - jar_file.jar
  - put_command.sql The "developmentDirectory" may contain project-specific files used to create the Java UDF. The "packageDirectory" may contain the .java files to compile and include in the package. The "class_file#.java" may contain the JAVA source code of the UDF. The "class_vile#.class" are the .class file(s) created by compiling the .java files. The manifest file may be used when combining the .class files (and dependency JAR files) into the JAR file. The "jar_file.jar" may contain the UDF code. And the "put_command.sql" may contain the SQL PUT command to copy the JAR file to the user storage.

As described above, the language-specific integration may compile the code in a two-step process. First, it may convert the raw JAVA code from the UDF body into a class file, which is also referred to as an intermediate compiled file. This intermediate file may be stored in the memory. For example, a javac may be used to compile the .java file to a .class file. Second, this intermediate file (e.g., class file) may be converted to a JAR file. Multiple class files (and other JAR files) may be packaged together in a JAR file.

At operation 612, the UDF server may then stream the compiled results (e.g., JAR files) from the UDF server to the worker process over gRPC using API calls. The format of the compiled data may be maintained during streaming from the UDF server to the worker process. For example, the stream may include a byte stream of compiled results.

At operation 614, the worker process, via an upload import jar, may upload the compiled files to a target storage (or user storage). The target storage may be an internal or external location. Based on the user storage, the compiled result files may be encrypted and compressed accordingly, as described above.

The compiled files may then be accessible and used for executing the UDF. For example, the compiled files may be retrieved and processed when the UDF is selected as part of a query.

Figure 7:
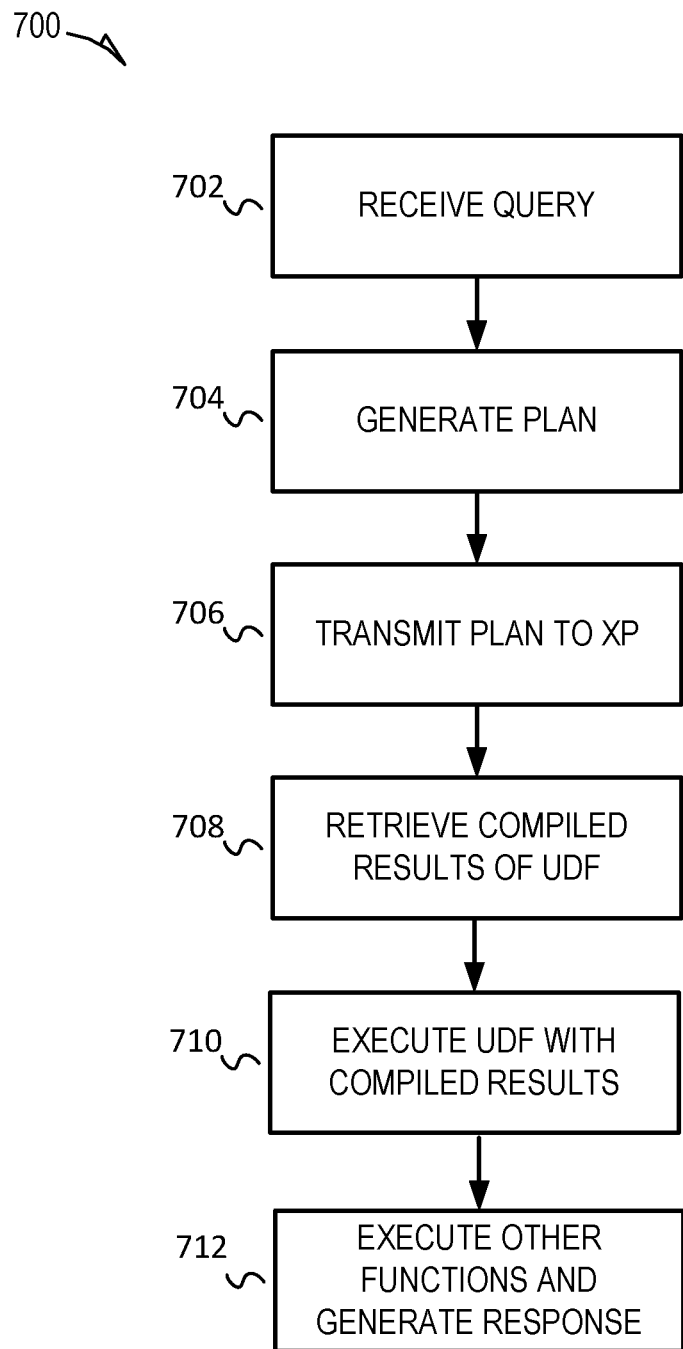
FIG. 7 shows a flow diagram of a method for executing a query, according to some example embodiments.

FIG. 7 shows a flow diagram of a method 700 for executing a query, according to some example embodiments. In an example, portions of the method 700 may be performed by the computing architecture described above with reference to FIG. 5.

At operation 702, a query may be received. For example, a query may be received by a GS. The query may reference a UDF previously created (or altered), which includes a function body in another programming language, as described above with reference to FIG. 6.

At operation 704, in response to the query, a plan to execute the query may be generated. For example, a GS (e.g., compute service manager 112) may generate a plan tree with different functions to execute the query. One of the functions in the plan tree may be a UDF previously created, which includes a function body in another programming language, as described herein. For example, the plan tree may include a "SELECT" function referencing the UDF.

At operation 706, the plan may be transmitted to an XP (or processing node). At operation 708, with respect to the UDF including a function body in another programming language, the XP may retrieve the compiled results, which were previously stored, as described above with reference to FIGS. 5 and 6. For example, the XP may reference the target storage in the UDF and download the compiled results (e.g., JAR file) from the target storage.

At operation 710, the UDF may be executed with the compiled results. For example, the compiled results may then be executed over data in a database. At operation 712, other functions, if any, in the plan may also be executed and the response to the query may be generated.

In some of the above embodiments, the function body in another programming language of a UDF may be compiled at the time of creation of the UDF and the compiled results may be stored for later use, such as query processing. In other embodiments, the UDF may be stored without being compiled and may be executed during processing of a query referencing that UDF.

Figure 8:
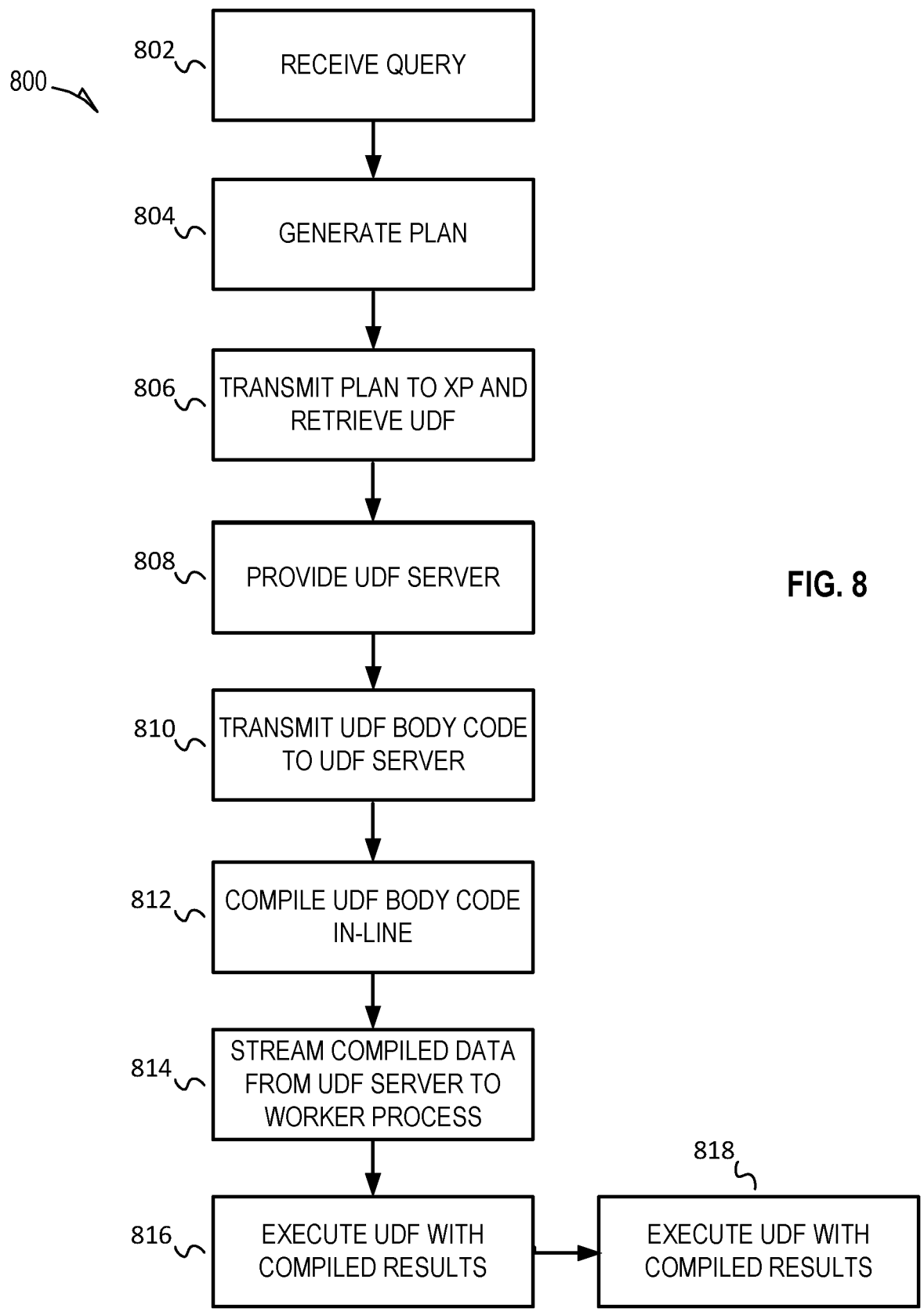
FIG. 8 shows a flow diagram of a method for executing a query, according to some example embodiments.

FIG. 8 shows a flow diagram of a method 800 for executing a query, according to some example embodiments. In an example, portions of the method 800 may be performed by the computing architecture described above with reference to FIG. 5.

At operation 802, a query may be received. For example, a query may be received by a GS. The query may reference a UDF previously created (or altered), which includes a function body in another programming language. That UDF may be stored in a metadata store (e.g., FDB) without being compiled at the time of creation.

At operation 804, in response to the query, a plan to execute the query may be generated. For example, a GS may generate a plan tree with different functions to execute the query. One of the functions in the plan tree may be a UDF previously created, which includes a function body in another programming language, as described herein. For example, the plan tree may include a "SELECT" function referencing the UDF.

At operation 806, the plan may be transmitted to an XP (or processing node) and the referenced UDF may be retrieved from storage. For example, the UDF may have previously been stored (uncompiled) in the metadata store or other location.

At operation 808, for each function requiring a sandbox, e.g., UDF, a sandbox (or UDF server) may be created or provided. Access to certain files may be restricted to the UDF server. The worker process and UDF server may communicate via remote calls (e.g., gRPC).

At operation 810, the UDF body code may be transmitted to the UDF server via remote calls (e.g., gRPC).

At operation 812, UDF server may employ a language-specific integration (e.g., JVM) to compile the UDF body code (i.e., in-line compilation). As described above, the language-specific integration may compile the code in a two-step process. First, it may convert the raw JAVA code from the UDF body into a class file, which is also referred to as an intermediate compiled file. This intermediate file may be stored in the memory. Second, this intermediate memory may be converted to a JAR file.

At operation 814, the UDF server may then stream the compiled results (e.g., JAR files) from the UDF server to the worker process using API calls, e.g., gRPC. The format of the compiled data may be maintained during streaming from the UDF server to the worker process. For example, the stream may include a byte stream of compiled results.

At operation 816, the UDF may be executed with the compiled results. For example, the compiled results may then be executed over data in a database. At operation 818, other functions, if any, in the plan may also be executed and the response to the query may be generated.

Some embodiments have been described using JAVA as an example of a different programming language. Other compilation-based languages can also be used, such as STELLA, C Sharp (C#), etc.

Figure 9:
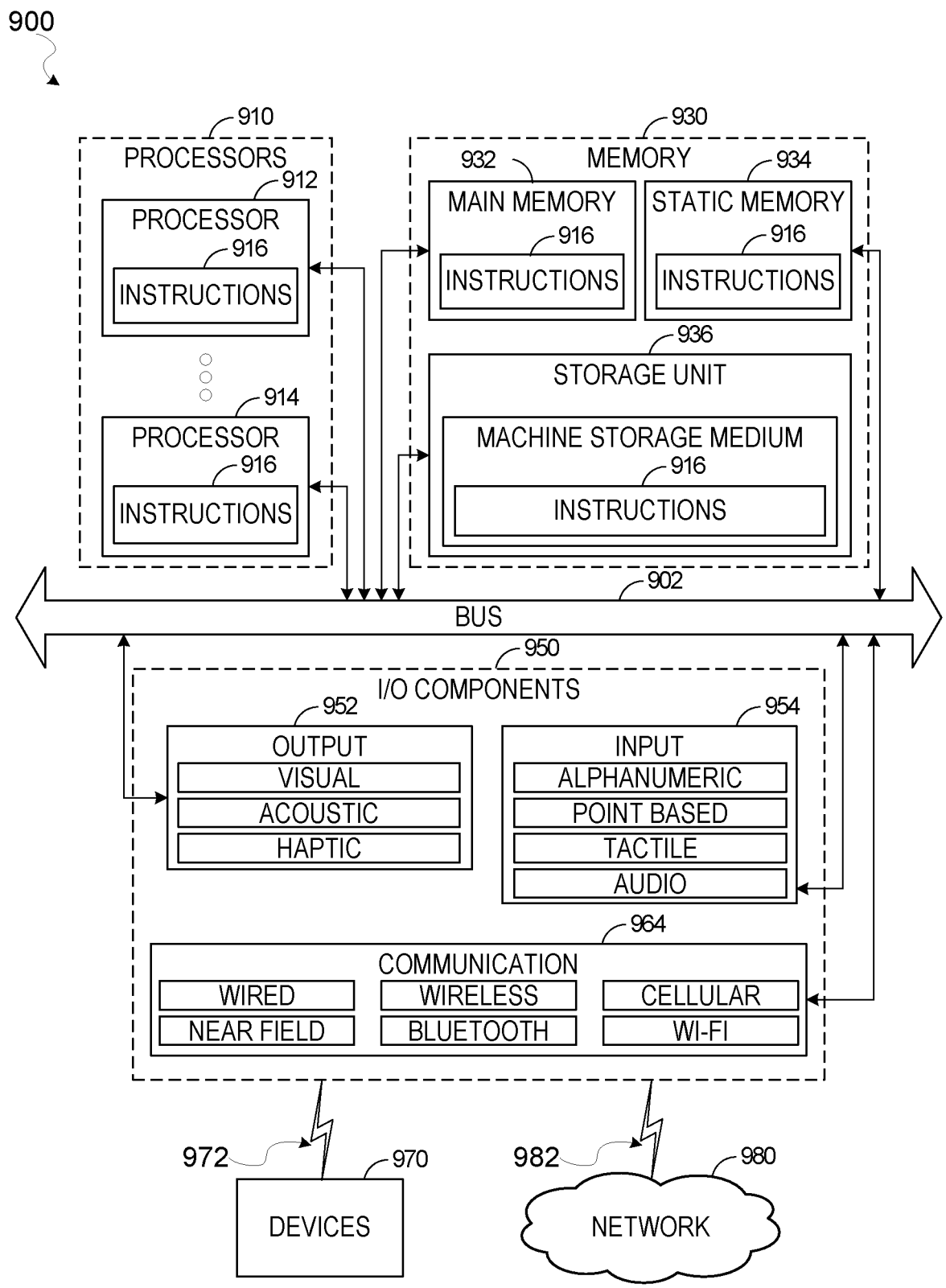
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods described herein. As another example, the instructions 916 may cause the machine 900 to implement portions of the data flows described herein. In this way, the instructions 916 transform a general, non-programmed machine into a particular machine 900 (e.g., the remote computing device 106, the access management system 118, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 118, the compute service manager 112, the execution platform 114, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method comprising: receiving, by a cloud processing system operating using a first programming language, a user defined function (UDF) including a body with a code portion in a second programming language; providing a worker process of a processing node and providing a separate user defined function (UDF) server in the processing node; transmitting the code portion of the UDF from the worker process to the UDF server via a remote call protocol; compiling the code portion UDF to generate compiled results in a language-specific integration operating on the UDF server; and transmitting the compiled results from UDF server to the worker process via the remote call protocol.

Example 2. The method of example 2, further comprising: in response to receiving a query referencing the UDF, retrieving the compiled results from a storage location; executing the UDF with the compiled results; and generating a response to the query.

Example 3. The method of any of examples 1-2, wherein the UDF is compiled in response to receiving a query referencing the UDF.

Example 4. The method of any of examples 1-3, further comprising: storing, by the worker process, the compiled results in a storage location.

Example 5. The method of any of examples 1-4, wherein the UDF defines the storage location.

Example 6. The method of any of examples 1-5, further comprising: encrypting the compiled results based on encryption information defined in the UDF, wherein the storage location is an external location.

Example 7. The method of any of examples 1-6, wherein the second programming language is JAVA.

Example 8. The method of any of examples 1-7, wherein the second programming language is C Sharp.

Example 9. The method of any of examples 1-8, wherein the UDF server and the worker process are associated with separate processors of the processing node and wherein the UDF server is restricted from accessing select data accessible by the worker process.

Example 10. A system comprising: at least one hardware processor; and at least one memory storing instructions that, when executed by the at least one hardware processor, cause the at least one hardware processor to perform operations implementing any one of example methods 1 to 9.

Example 11. A machine-readable storage device embodying instructions that, when executed by a machine, cause the machine to perform operations implementing any one of example methods 1 to 9.

What is claimed is:

1. A method comprising:
    receiving, by a compute service manager of a cloud processing system operating using a first programming language, a query referencing a user defined function (UDF) including a body with a code portion in a second programming language;
    generating a query plan to execute the query, the query plan including at least one function associated with the UDF;
    transmitting the query plan to a processing node;
    retrieving, by the processing node, stored compiled results associated with the UDF, wherein the processing node references a target storage defined in the UDF to retrieve the stored compiled results;
    executing the UDF with the compiled results using data in a database referenced in the query; and
    generating a response to the query based on executing the UDF.

2. The method of claim 1, wherein the query plan includes a plan tree with a plurality of functions and the at least one function associated with the UDF includes a select function.

3. The method of claim 1, further comprising:
    decrypting the compiled results based on encryption information defined in the UDF.

4. The method of claim 1, wherein the second programming language is JAVA.

5. The method of claim 1, wherein the second programming language is C Sharp.

6. The method of claim 1, wherein the compiled results are generated using a UDF server in the processing node separate from a worker process of the processing node,
    wherein the UDF server and the worker process are associated with separate processors of the processing node and wherein the UDF server is restricted from accessing select data accessible by the worker process.

7. A machine-storage medium embodying instructions that, when executed by a machine, cause the machine to perform operations comprising:
- receiving, by a compute service manager of a cloud processing system operating using a first programming language, a query referencing a user defined function (UDF) including a body with a code portion in a second programming language;
- generating a query plan to execute the query, the query plan including at least one function associated with the UDF;
- transmitting the query plan to a processing node;
- retrieving, by the processing node, stored compiled results associated with the UDF, wherein the processing node references a target storage defined in the UDF to retrieve the stored compiled results;
- executing the UDF with the compiled results using data in a database referenced in the query; and
- generating a response to the query based on executing the UDF.

8. The machine-storage medium of claim 7, wherein the query plan includes a plan tree with a plurality of functions and the at least one function associated with the UDF includes a select function.

9. The machine-storage medium of claim 7, further comprising:
- decrypting the compiled results based on encryption information defined in the UDF.

10. The machine-storage medium of claim 7, wherein the second programming language is JAVA.

11. The machine-storage medium of claim 7, wherein the second programming language is C Sharp.

12. The machine-storage medium of claim 7, wherein the compiled results are generated using a UDF server in the processing node separate from a worker process of the processing node,
- wherein the UDF server and the worker process are associated with separate processors of the processing node and wherein the UDF server is restricted from accessing select data accessible by the worker process.

13. A system comprising:
- at least one hardware processor; and
- at least one memory storing instructions that, when executed by the at least one hardware processor, cause the at least one hardware processor to perform operations comprising:
  - receiving, by a compute service manager of a cloud processing system operating using a first programming language, a query referencing a user defined function (UDF) including a body with a code portion in a second programming language;
  - generating a query plan to execute the query, the query plan including at least one function associated with the UDF;
  - transmitting the query plan to a processing node;
  - retrieving, by the processing node, stored compiled results associated with the UDF, wherein the processing node references a target storage defined in the UDF to retrieve the stored compiled results;
  - executing the UDF with the compiled results using data in a database referenced in the query; and
  - generating a response to the query based on executing the UDF.

14. The system of claim 13, wherein the query plan includes a plan tree with a plurality of functions and the at least one function associated with the UDF includes a select function.

15. The system of claim 13, the operations further comprising:
- decrypting the compiled results based on encryption information defined in the UDF.

16. The system of claim 13, wherein the second programming language is JAVA.

17. The system of claim 13, wherein the second programming language is C Sharp.

18. The system of claim 13, wherein the compiled results are generated using a UDF server in the processing node separate from a worker process of the processing node,
- wherein the UDF server and the worker process are associated with separate processors of the processing node and wherein the UDF server is restricted from accessing select data accessible by the worker process.

* * * * *